(12) United States Patent
Armangau et al.

(10) Patent No.: US 10,613,790 B1
(45) Date of Patent: Apr. 7, 2020

(54) MITIGATING FLASH WEAR WHEN PERFORMING STORAGE TIERING

(71) Applicant: EMC IP Holding Company LLC, Hopkinton, MA (US)

(72) Inventors: Philippe Armangau, Acton, MA (US); Feng Zhang, Shanghai (CN); Xianlong Liu, Shanghai (CN); Chang Yong Yu, Shanghai (CN); Ruiling Dou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 15/395,685

(22) Filed: Dec. 30, 2016

(51) Int. Cl.
*G06F 12/00* (2006.01)
*G06F 13/00* (2006.01)
*G06F 3/06* (2006.01)

(52) U.S. Cl.
CPC ............ *G06F 3/065* (2013.01); *G06F 3/0616* (2013.01); *G06F 3/0631* (2013.01); *G06F 3/0635* (2013.01); *G06F 3/0659* (2013.01); *G06F 3/0685* (2013.01)

(58) Field of Classification Search
CPC ...... G06F 3/065; G06F 3/0616; G06F 3/0631; G06F 3/0635; G06F 3/0659; G06F 3/0685
USPC ........................................................ 711/103
See application file for complete search history.

(56) References Cited

U.S. PATENT DOCUMENTS

| | | | | |
|---|---|---|---|---|
| 7,574,623 B1 * | 8/2009 | Goel | ...................... | G06F 11/008 714/47.2 |
| 8,463,825 B1 * | 6/2013 | Harty | ................ | G06F 17/30233 707/813 |
| 8,935,493 B1 * | 1/2015 | Dolan | ................... | G06F 3/0649 711/117 |
| 9,069,682 B1 | 6/2015 | Veeraswamy | | |
| 9,229,854 B1 * | 1/2016 | Kuzmin | .............. | G06F 12/0246 |
| 9,400,792 B1 | 7/2016 | Bono et al. | | |
| 9,454,331 B1 * | 9/2016 | Bent | ........................ | G06F 3/067 |
| 9,459,809 B1 * | 10/2016 | Chen | ...................... | G06F 3/0644 |
| 9,477,431 B1 * | 10/2016 | Chen | ...................... | G06F 3/0689 |
| 9,507,887 B1 * | 11/2016 | Wang | .................. | G06F 17/5009 |
| 9,542,125 B1 * | 1/2017 | Chen | ...................... | G06F 3/0679 |
| 9,594,514 B1 | 3/2017 | Bono et al. | | |
| 9,632,709 B1 * | 4/2017 | Basham | ................ | G06F 3/0611 |
| 9,659,019 B1 * | 5/2017 | Bent | ................. | G06F 17/30091 |
| 9,665,288 B1 * | 5/2017 | Aharoni | .................. | G06F 3/061 |
| 9,753,987 B1 * | 9/2017 | Dolan | .................. | G06F 17/3053 |
| 2006/0282610 A1 * | 12/2006 | Dariel | .................... | G06F 3/0616 711/103 |

(Continued)

OTHER PUBLICATIONS

EMC VNX Fast VP VNX5100, VNX5300, VNX5500, VNX5700, & VNX7500 A Detailed Review; Dec. 2013; 25 pages.

*Primary Examiner* — Sheng Jen Tsai
(74) *Attorney, Agent, or Firm* — BainwoodHuang

(57) ABSTRACT

A technique for performing storage tiering accesses allocation metadata in a data storage system and applies that allocation metadata when relocating data from a selected extent to a target extent. The selected extent includes a range of contiguous blocks. The allocation metadata may designate each of these blocks as either allocated or free. When relocating data from the selected extent to the target extent, the technique copies data of the selected extent on a per-block basis, checking whether that block is allocated or free before copying it to the target extent.

20 Claims, 4 Drawing Sheets

(56) References Cited

U.S. PATENT DOCUMENTS

| | | | |
|---|---|---|---|
| 2007/0156957 A1* | 7/2007 | MacHardy | G06F 3/0607 |
| | | | 711/114 |
| 2009/0141602 A1* | 6/2009 | Zeng | G11B 20/1833 |
| | | | 369/53.17 |
| 2013/0282982 A1* | 10/2013 | Hayashi | G06F 3/061 |
| | | | 711/118 |
| 2015/0006787 A1* | 1/2015 | Liu | G06F 3/0604 |
| | | | 711/103 |
| 2015/0006788 A1* | 1/2015 | Liu | G06F 3/0685 |
| | | | 711/103 |
| 2016/0042005 A1* | 2/2016 | Liu | G06F 17/30132 |
| | | | 711/103 |
| 2017/0010826 A1* | 1/2017 | Basham | G06F 3/0619 |
| 2017/0177638 A1* | 6/2017 | Bhosale | G06F 17/301 |

\* cited by examiner

MITIGATING FLASH WEAR WHEN PERFORMING STORAGE TIERING

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Data storage systems commonly arrange non-volatile storage devices in different classes, or "tiers," where each tier includes many storage drives of like kind. For example, a data storage system may include one or more flash tiers, which include flash drives that provide high-speed storage at high cost, and one or more magnetic tiers, which include magnetic disk drives that provide high capacity storage at lower cost, as well as lower speed.

Some data storage systems include software programs for performing automatic storage tiering. Such programs monitor storage elements to determine their "data temperatures," i.e., the frequencies at which they are read and/or written, and move data between or among storage tiers to better utilize storage resources overall. For example, an automatic storage tiering program may identify "hot" data, i.e., data which is accessed frequently and thus has high data temperature. If the hot data has been placed on a magnetic storage tier, the program may move the data to a flash storage tier, so that the hot data can be accessed more quickly. Likewise, the program may identify "cold" data, which has low data temperature. If the cold data has been placed on a flash storage tier, the program may move the cold data to a magnetic storage tier, such that the flash storage occupied by the cold data is made available for receiving more hot data.

SUMMARY

Unfortunately, prior approaches to automatic storage tiering can accelerate wear in flash drives and can contribute to their early failure. For example, prior tiering solutions move data in increments of storage, such as slices, where a "slice" is a contiguous extent of addressable storage of at least many megabytes and as large as one gigabyte or more. When a storage tiering program moves data between storage tiers, it copies all the data from a selected slice on one storage tier to a target slice on another. If the target slice is derived from a flash tier, then the storage tiering program will copy an entire slice's worth of data onto the flash slice. However, flash drives have a known failure mechanism by which they degrade at a microscopic level in response to being written. Thus, large writes to flash that accompany storage tiering may prematurely age flash drives and cause them to fail much sooner than they otherwise might.

In contrast with prior tiering solutions, which may contribute to early failure in flash drives, an improved technique for performing storage tiering accesses allocation metadata in a data storage system and applies that allocation metadata when relocating data from a selected extent to a target extent. The selected extent includes a range of contiguous blocks. The allocation metadata may identify each of these blocks as either allocated or free. When relocating data from the selected extent to the target extent, the technique copies data of the selected extent on a per-block basis, checking whether that block is allocated or free before copying it to the target extent.

Advantageously, the improved technique copies only data of those blocks which are allocated and therefore avoids copying free blocks, potentially preventing many writes to the target extent. When the target extent is derived from flash, the improved technique potentially has a large effect on preserving underlying flash storage. For example, if the selected extent has only 8 allocated blocks out of total capacity of 32 K blocks, then the flash wear that results from moving this data is reduced by a factor of 4 K.

Certain embodiments are directed to a method of performing storage tiering in a data storage system. The method includes identifying a storage extent that contains data to be relocated from a current storage tier to a flash storage tier, the storage extent providing a range of contiguous blocks and occupying a range of contiguous address space within a volume upon which a file system is built. The flash storage tier is derived from a set of flash drives. The method further includes accessing allocation metadata of the file system to identify a set of allocated blocks in the storage extent that are allocated by the file system, each of the set of allocated blocks having a respective block location within the storage extent. The method still further includes populating a flash extent of storage in the flash tier by copying data from each of the set of allocated blocks at the respective block locations to corresponding block locations in the flash extent, the flash extent then replacing the identified storage extent in the volume upon which the file system is built.

Other embodiments are directed to a data storage system constructed and arranged to perform a method of performing storage tiering, such as the method described above. Still other embodiments are directed to a computer program product. The computer program product stores instructions which, when executed on control circuitry of a data storage system, cause the control circuitry to perform a method of performing storage tiering in a data storage system, such as the method described above.

The foregoing summary is presented for illustrative purposes to assist the reader in readily grasping example features presented herein; however, the foregoing summary is not intended to set forth required elements or to limit embodiments hereof in any way. One should appreciate that the features described above can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for performing storage tiering accesses allocation metadata in a data storage system and applies the allocation metadata when relocating data from a selected extent to a target extent. The technique copies data of the selected extent on a per-block basis, checking whether each block is allocated or free before copying it to the target extent.

Figure 1:
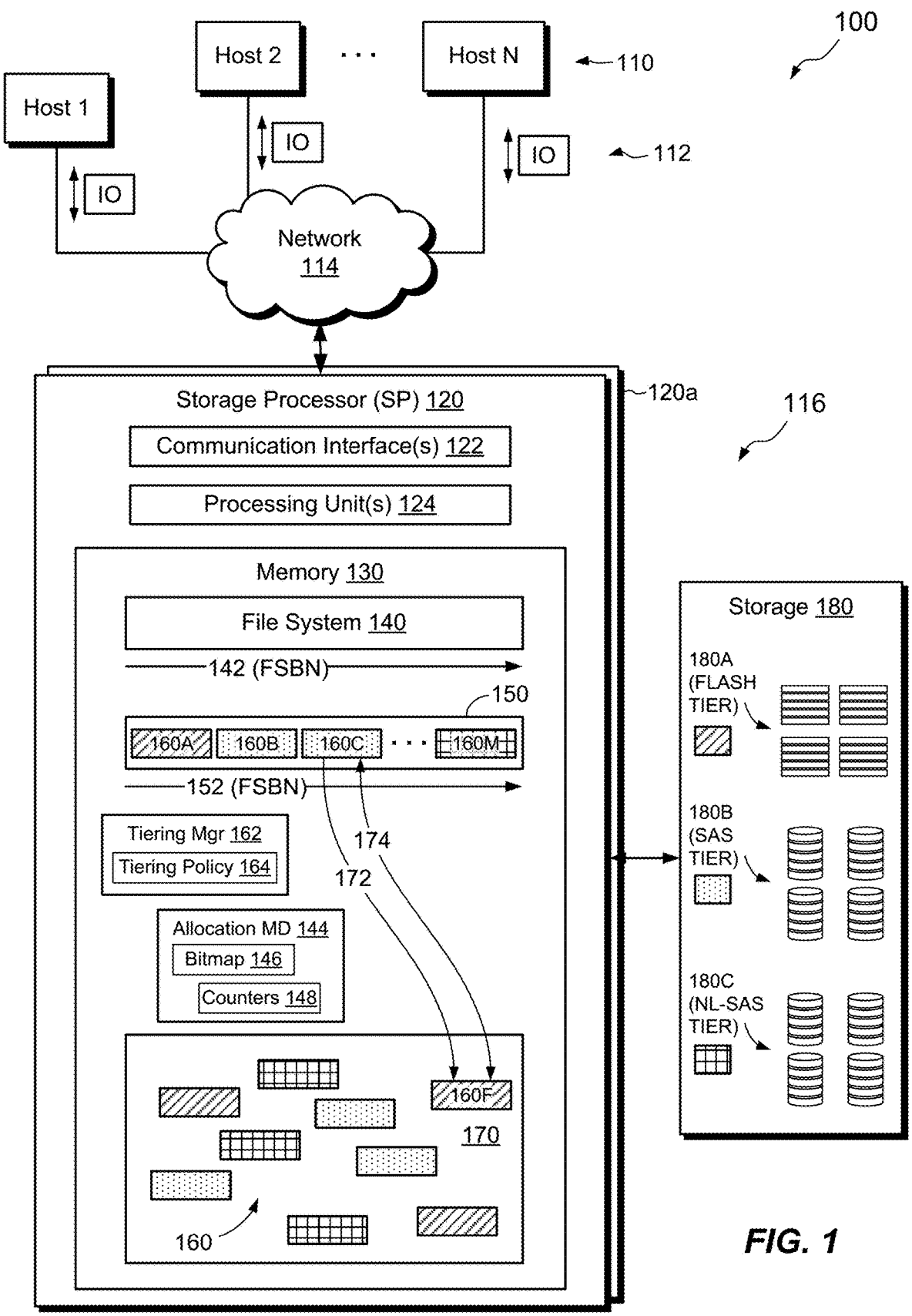
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180. The storage 180 includes multiple storage drives of different types arranged in respective storage tiers. For example, flash tier 180A includes multiple flash drives, SAS (Serial Attached SCSI—Small Computer System Interface) tier 180B includes multiple magnetic SAS drives, and NL-SAS (Near Line SAS) tier 180C includes multiple magnetic NL-SAS drives. These particular storage tiers are merely examples. Alternative arrangements may include multiple tiers for respective levels of flash storage, tiers for other types of magnetic disk drives, tiers for optical drives, tiers for tape drives, and the like. In some examples, storage drives in storage 180 are arranged in RAID (Redundant Array of Independent Disks) groups. In such arrangements, the SP 120 may treat each RAID group in storage 180 as a single logical disk drive.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 may be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs (Central Processing Units). The memory 130 includes both volatile memory, such as random access memory, and non-volatile memory, such as one or more read-only memories, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes with data and by operation of software instructions, a file system 140, allocation metadata 144, a volume 150, a tiering manager 162, and a storage pool 170. The file system 140 has a physical address space 142, denominated in blocks, where a "block" is the smallest unit of storage that may be allocated in the file system 140. In an example, the physical address space 142 ranges from zero to some large number. Each address in the physical address space 142 uniquely identifies a block by its file system block number, or "FSBN." Blocks may be provided in uniformly-sized units, which may be 4 KB or 8 KB, for example. Some instances of file system 140 may support multiple block sizes, such as one block size for file data and another block size for file metadata.

File system 140 is built upon volume 150. Volume 150 has a physical address space 152, which corresponds block-for-block with the physical address space 142 of the file system 140. The volume 150 is provisioned with storage extents, such as slices 160. Each slice 160 is a contiguous range of storage derived from a particular storage tier. In an example, each slice may be derived from a single RAID group of a single storage tier, e.g., as a stripe or set of stripes across that RAID group. Slices 160 are preferably uniform in size, such as 256 MB or 1 GB, for example. In the example shown, volume 150 is a sparse metavolume, in which certain ranges of address space 152 are provisioned with slices 160 but other ranges are empty.

Slices 160 reside in a storage pool 170, which may provision slices 160 to the volume 150, e.g., on demand as volume 150 requires more storage space. The storage pool 170 may also reclaim provisioned slices that are no longer required. In the example shown, storage pool 170 includes multiple slices 160 derived from each of the storage tiers 180A, 180B, and 180C, with slices from each storage tier shown with respective shading patterns. In some examples, the same storage pool 170 supports multiple volumes and corresponding file systems. In addition, the SP 120 may operate multiple storage pools.

In a typical arrangement, volume 150 includes hundreds or thousands of slices, only four of which are shown for simplicity. Slice 160A is derived from flash tier 180A, slices 160B and 160C are derived from SAS tier 180B, and slice 160M is derived from NL-SAS tier 180C.

In example operation, hosts 110 issue IO requests 112 to the data storage system 116 to request reads and writes of one or more data objects stored in the data storage system 116, such as in file system 140. SP 120 receives the IO requests 112 at communication interface(s) 122 and passes them to memory 130 for further processing.

As the data storage system 116 processes IO requests 112, the file system 140 maintains allocation metadata 144 indicating which blocks in the physical address space 142 are allocated and which blocks are free. For example, allocation metadata 144 may include a bitmap 146 having a single-bit value for each address (i.e., each FSBN) in the physical address space 142. For each block in the file system 140 that is allocated, e.g., in response to a write IO request directed to that block, the file system 140 sets the corresponding bit in the bitmap 146. For each block that is free, the file system 140 unsets the corresponding bit in the bitmap 146. Blocks that are never allocated are designated as free. One may determine the allocation status of a particular block by inspecting the bitmap 146 at the FSBN for that block. In some examples, allocation metadata 144 organizes the bitmap 146 not only by block but also by slice, such that the allocation status of provisioned slices may readily be obtained. In some examples, the allocation metadata 144 further includes counters 148. The counters 148 track counts of allocated blocks and may also be organized by slice, such that the number of allocated blocks in a slice may be readily obtained.

As IO requests 112 arrive, the tiering manager 162 monitors the IO requests 112 directed to each provisioned slice (e.g., to each of slices 160A through 160M in the volume 150) and generates a data temperature for each provisioned slice. Some slices may be hot, indicating a high degree of IO activity, whereas other slices may be cold, indicating a low degree of IO activity. After monitoring IO activity for a period of time, the tiering manager 162 may initiate automatic storage tiering. Such automatic storage tiering may run in the background on SP 120, out of band with IO requests 112, and in accordance with a tiering policy 164. In an example, the tiering policy 164 is rule-based, at least in part, and specifies rules that govern how the tiering manager 162 performs its functions. One rule, for example, may be to place hot data on flash tier 180A. Another rule may be to place cold data on NL-SAS tier 180C. Yet another rule may be to place data of medium temperature (e.g., warm and/or cool) on SAS tier 180B.

Assume, for example, that data on provisioned slice 160C, which is derived from SAS tier 180B, warms up over time and becomes hot. The tiering manager 162, which has been monitoring IO requests 112 to slice 160C, detects this change in data temperature and, in accordance with tiering policy 164, selects the data on slice 160C for up-tiering to the flash tier 180A. When automatic storage tiering runs, the tiering manager 162 identifies an available flash slice 160F in the pool 170 and begins to copy (arrow 172) data from slice 160C to slice 160F.

In accordance with improvements hereof, copy operation 172 is limited only to those blocks in slice 160C that the allocation metadata 144 identifies as allocated. For example, the tiering manager 162 accesses allocation bitmap 146 and identifies a bit in the bitmap 146 having an FSBN that corresponds to the first block in slice 160C. If the bit is set, the tiering manager 162 copies the contents of the block to a corresponding block in the flash slice 160F. If the bit is not set, the tiering manager 162 skips this blocks and moves on to the next one. Operation may progress in this manner, block-by-block, checking each bit in the bitmap 146 and copying the contents of the corresponding block to slice 160F only if the bit is set, skipping each block for which the corresponding bit in the bitmap 146 is not set. In this manner, only contents of the blocks in slice 160C that the file system 140 has actually allocated, e.g., that are actually in use, are copied to flash slice 160F. Other blocks are skipped. To promote efficiency, copy operation 172 may in some examples aggregate consecutive allocated blocks in larger extents before copying. For instance, copy operation may aggregate extents in multiples of 128 KB (e.g., from 128 KB to 16 MB, where the aggregation size is configurable by an administrator).

When copying contents of blocks in slice 160C to corresponding blocks in flash slice 160F, the copy operation 172 preserves the order of contents. For example, when copying contents of a first, second, and third blocks of slice 160C to flash slice 160F, the copy operation 172 places those contents in the first, second, and third block locations of flash slice 160F.

One should appreciate that the tiering manager 162 may employ a variety of methods to achieve the above-described copy operation 172. For instance, copying may start at any block location in slice 160C, multiple threads may copy in parallel, and copying may progress in any order. Also, the copy operation 172 may be performed while the data storage system continues to receive and process IO requests 112. Any writes directed to the FSBN range of slice 160C while the copying 172 is in progress may be directed to flash slice 160F for blocks already copied, or may be directed to slice 160C, or to both slices, for blocks yet to be copied. In some examples, the tiering manager 162 performs copy operation 172 with reference to counters 148. For example, counters 148 may include counts of allocated blocks in groups of blocks smaller than slices, e.g., in increments of 128 KB, 256 KB, 512 KB, and so forth. Tiering manager 162 may check such counters 148 and skip entire regions of slice 160C if the counts of allocated blocks in those regions is zero.

Once copying is complete, or sooner in some examples, the tiering manager 162 performs a replacement operation 174 to replace slice 160C in volume 150 with flash slice 160F. Slice 160C may be returned to the storage pool 170 as a free slice, such that it is available for reuse elsewhere. The replacement of slice 160C with flash slice 160F may proceed entirely transparently to the file system 140, which continues to address the same contents at the same FSBNs. Performance may be greatly improved, however.

Figure 2:
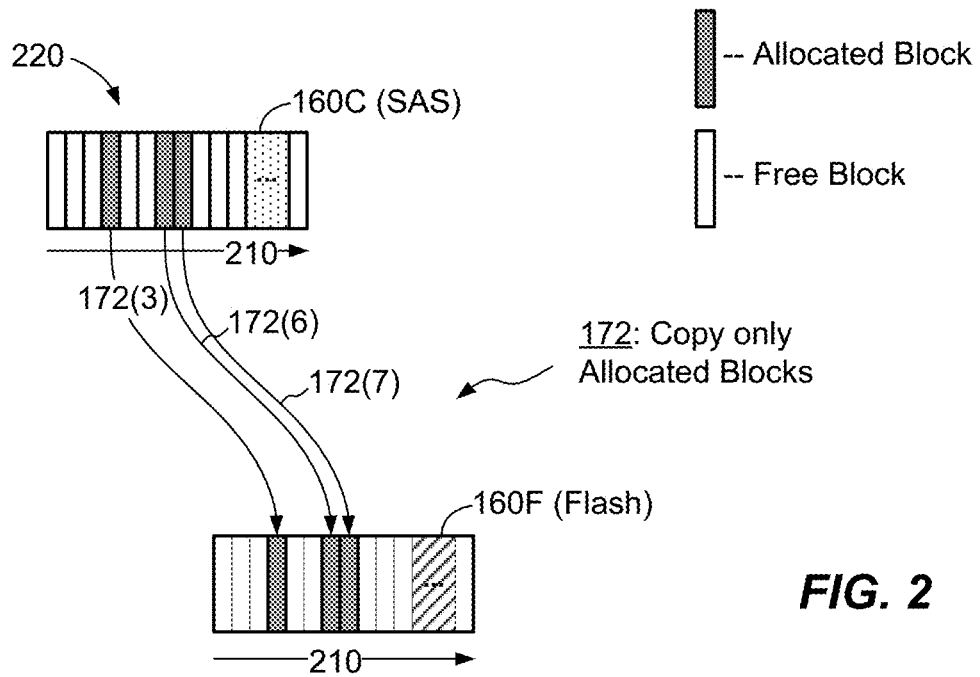
FIG. 2 is a block diagram showing one example copy operation that may accompany storage tiering in the environment of FIG. 1.

FIG. 2 shows example aspects of the copy operation 172 in greater detail. Here, slices 160C and 160F (FIG. 1) each have an address range 210 of contiguous block locations. Selected slice 160C has only three allocated blocks, at the third, sixth, and seventh locations (starting from zero). The rest of the blocks in slice 160C are free. FIG. 2 indicates allocated and free blocks as tracked by metadata 144 using shading.

During copy operation 172, the tiering manager 162 checks the allocation status of each block 220 in slice 160C and copies only the third, sixth, and seventh blocks, via operations 172(3), 172(6), and 172(7). These operations copy the blocks, respectively, to the third, sixth, and seventh locations of flash slice 160F. Thus, the copy operation 172 to flash slice 160F is completed by copying only three blocks. As the flash slice 160F may include thousands of block locations, limiting the copying to just the allocated blocks reduces the volume of writes to the flash drives that underlie the slice 160F and thus preserves their longevity.

One should appreciate that applying allocation metadata 144 to limit copying during automatic storage tiering is not necessarily beneficial when copying data from a flash slice to a magnetic slice, i.e., one derived from magnetic disk drives, or when copying data from one magnetic slice to another. Although life expectancy of flash drives may be degraded as a result of performing writes, no such degradation has been observed as a result of performing reads. Also, magnetic disk drives do not generally age excessively as a result of performing either reads or writes. In addition, while writes to random locations on magnetic disk drives tend to be slow, long writes to contiguous disk locations can be very fast, in some cases rivaling the speed of flash. Thus, when the target of a tiering operation is a magnetic slice, there may be no benefit to limiting copying based on allocation. To the contrary, the additional processing required to access allocation metadata 144 may not justify any savings. Further, if applying allocation metadata 144 has the effect of breaking up long, continuous writes to magnetic disks into smaller writes of less data, the overall effect of applying such metadata may actually be detrimental.

Figure 3:
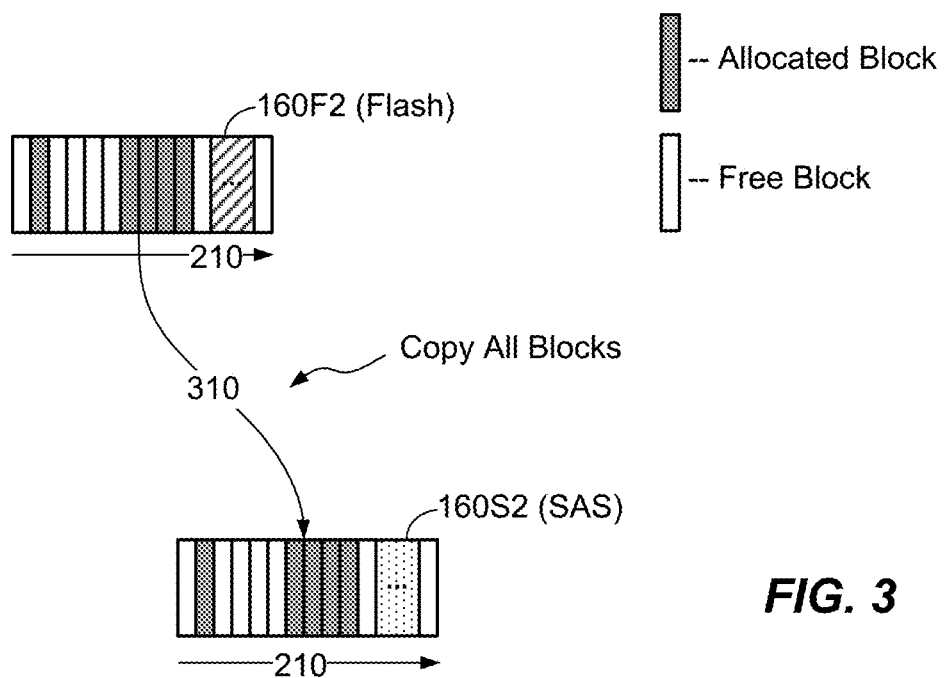
FIG. 3 is a block diagram showing another example copy operation that may accompany storage tiering in the environment of FIG. 1.

FIG. 3 shows an example copy operation 310 when tiering down from a flash slice 160F2 to a magnetic slice 160S2, such as SAS. Rather than copying data from slice 160F2 to slice 160S2 on a per-block basis, the entire contents of slice 160F2 are copied all together. There is no need to access allocation metadata 144. One should appreciate that copy operation 310 promotes efficiency and does not contribute to flash wear, even though all blocks of slice 160F2 are copied. Although FIG. 3 shows a different approach from the one shown in FIG. 2, which may be beneficial in some cases, one should not have the impression that the invention hereof requires that copying be performed differently when the target is a magnetic slice than when the target is a flash slice. For example, copying can proceed as shown in FIG. 2 for all cases, whether copying is being performed to flash or to magnetic storage.

Figure 4:
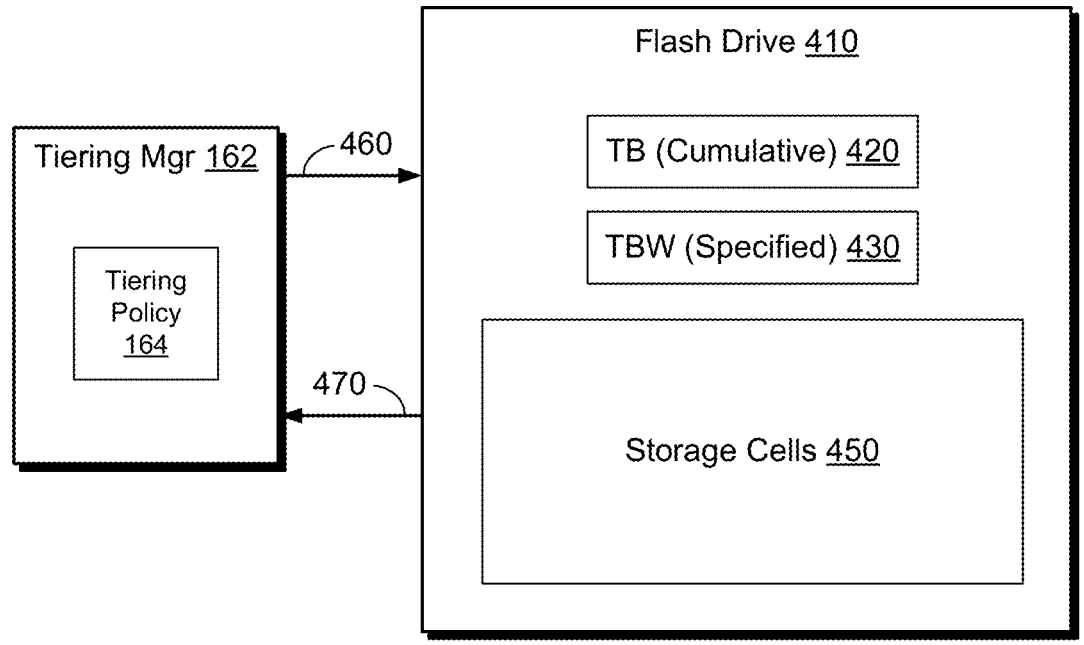
FIG. 4 is a block diagram showing an example interaction between a tiering manager and a flash drive.

FIG. 4 shows an example interaction between the tiering manager 162 and a flash drive 410, which may be representative of any flash drive in the flash tier 180A. Here, flash drive 410 includes registers 420 and 430, as well as storage cells 450 for storing bulk data. Register 420 stores a cumulative amount of data already written to the flash drive 410 and may be expressed in units of terabytes (TB). Register 430 stores a manufacturer's specification for endurance of the flash drive 410, where "endurance" is a total amount of data that may be written to the storage cells 450 in the flash drive 410 within its manufacturer's warranty. For example, writing more data than the endurance specification provides may void the warranty on the flash drive 410. The flash drive 410 may express endurance as TBW (TeraBytes Written), where the number stored in register 430 provides the total number of terabytes that may be written to the drive within its warranty. With this arrangement, the difference between TBW (from register 430) and TB (from register 420) may represent a remaining volume of writes that may be performed in flash drive 410 within warranty. Register 430 may alternatively express endurance as DWPD (Drive Writes Per Day), which is equivalent to TBW divided by the product of the capacity of the drive and the total number of days in the drive's warranty period. For example, a flash drive with a TBW of 1,000, a capacity of 1 TB, and a warrantied service life of 5 years would have a DWPD of 1,000 TB/(1 TB*365.25 days*5 years), or approximately 1.8. This means that one could rewrite the entire contents of the flash drive 1.8 times per day for 5 years without exceeding warranty.

In an example, the tiering manager 162 sends a query 460 to flash drive 410 to obtain the contents of registers 420 and 430. In response to the query 460, the flash drive 410 returns a query response 470 that provides the requested contents. Tiering manager 462 may maintain an internal database of such values for all flash drives in the flash tier 180A, and may requery each flash drive for updated values of TB (from registers 420) on a regular basis, such as daily, weekly, etc. The tiering manager 162 may then apply its database of flash endurance and usage information in making tiering decisions. For example, the tiering policy 164 may specify rules for performing storage tiering based on the endurance of particular drives and/or on the usage of such drives.

Figure 5:
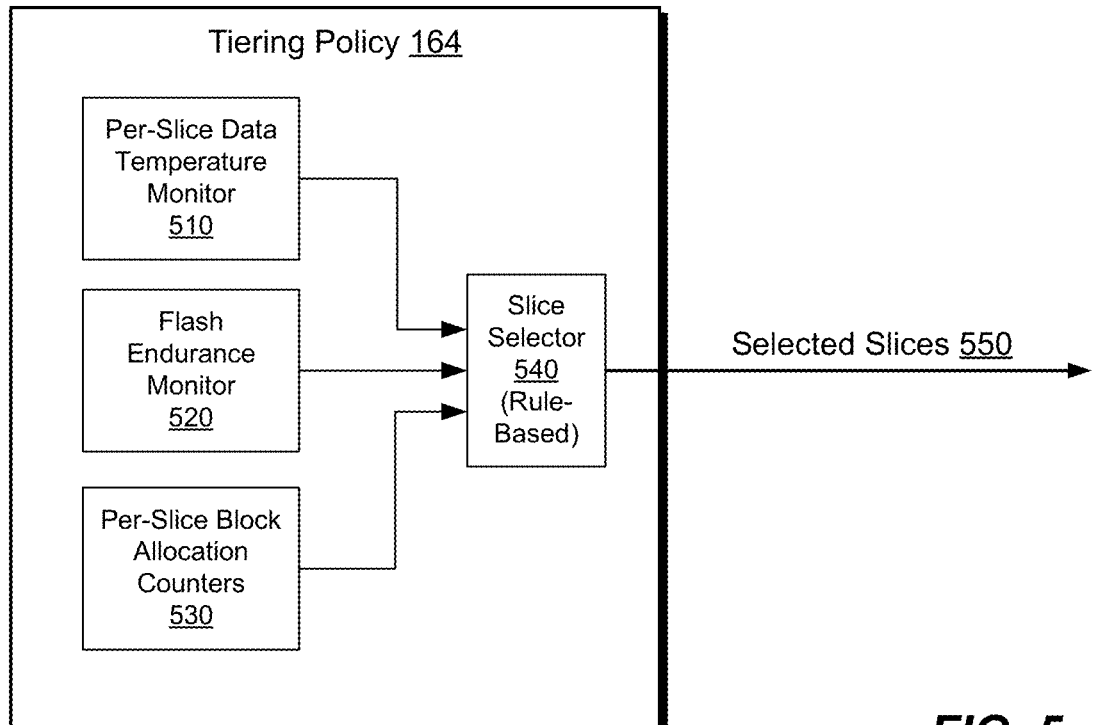
FIG. 5 is a block diagram showing an example operation of a tiering policy operating in the tiering manager of FIG. 4.

FIG. 5 shows example features of the tiering policy 164 in additional detail. Here, temperature monitor 510 measures data temperature on a per-slice basis, while flash endurance monitor 520 tracks the endurance of each flash drive in the flash tier 180A. Flash endurance monitor 520 may also track remaining capacity (e.g., TBW-TB) on each flash drive. Further, slice allocation counters 530 track the number of blocks allocated to file system 140 in each slice 160. A slice selector 540 receives input from monitors 510 and 520 and from counters 530 and makes rules-based decisions to select slices 550 whose contents are to be moved to the flash tier 180A. Slice selector 540 may operate based on the following rules, for example:

Temperature Rule: slice selector 540 selects slices 550 based on data temperature, giving preference to hotter slices over cooler slices;

Low Allocation, Low Endurance Rule: slice selector selects slices 550 based on their numbers of allocated blocks and on the endurance levels and/or remaining capacities of the flash drives that will receive the relocated contents. For example, if target flash slices are derived from low-endurance flash drives, and/or from flash drives with little remaining capacity, preference is given to slices having small numbers of allocated blocks (e.g., less than 50% allocated). For purposes of these rules, "low endurance" and "little remaining capacity" are each characterized based on comparisons with other flash drives in the flash tier 180A. For example, a flash drive has low endurance if its endurance falls within the bottom 50% of endurance values of all flash drives in the flash tier 180A. Likewise, a flash drive has high endurance if its endurance falls within the top 50%. Low and high values of remaining capacity may be judged in a similar manner, based on how the capacity of a drive stacks up against other drives in the flash tier 180A, and whether the capacity of a particular drive is in the top half or bottom half of the rankings.

High Allocation, High Endurance Rule: slice selector again selects slices 550 based on their numbers of allocated blocks and on the endurance levels and/or remaining capacities of the flash drives. Here, however, target flash slices are derived from high-endurance flash drives, and/or from flash drives with a lot of remaining capacity, and preference is given to slices having large numbers of allocated blocks (e.g., more than 50% allocated).

In an example, the tiering manager 162 operates the above-described rules in parallel, and performs a weighted or combinatorial methodology to arrive at selections 550, such as by using weighted sums, fuzzy logic, neural nets, machine learning, or combinatorial logic, for example.

Figure 6:
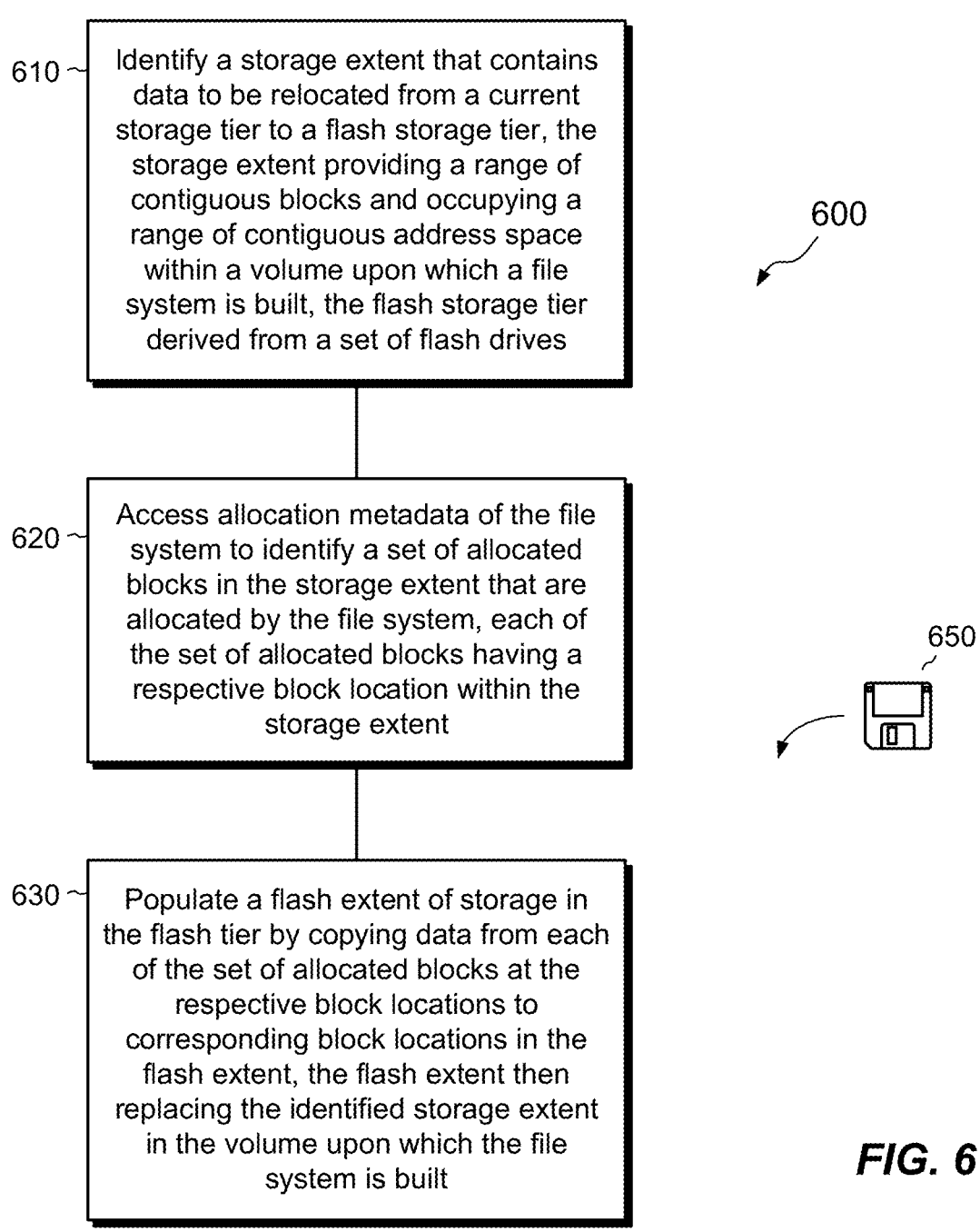
FIG. 6 is a flowchart showing an example method of performing storage tiering in the environment of FIG. 1.

FIG. 6 shows an example method 600 that may be carried out in connection with the environment 100. The method 600 is typically performed by the software constructs described in connection with FIG. 1, which may reside in the memory 130 of the storage processor 120 and are run by the set of processing units 124. The various acts of method 600 may be ordered in any suitable way. Accordingly, embodiments may be constructed in which acts are performed in orders different from that illustrated, which may include performing some acts simultaneously.

At 610, a storage extent (e.g., slice 160C) is identified that contains data to be relocated from a current storage tier (e.g., SAS 180B) to a flash storage tier 180A, the storage extent providing a range of contiguous blocks 220 and occupying a range of contiguous address space within a volume 150 upon which a file system 140 is built. The flash storage tier 180A is derived from a set of flash drives, such as those shown in storage 180.

At 620, allocation metadata 144 of the file system 140 are accessed to identify a set of allocated blocks in the storage extent that are allocated by the file system 140, each of the set of allocated blocks having a respective block location within the storage extent (e.g., at locations 3, 6, and 7 of slice 160C; see FIG. 2).

At 630, a flash extent of storage (e.g., 160F) in the flash tier 180A is populated by copying data from each of the set of allocated blocks at the respective block locations to corresponding block locations in the flash extent 160F, the flash extent 160F then replacing the identified storage extent 160C in the volume 150 upon which the file system 140 is built.

An improved technique for performing storage tiering has been described, which accesses allocation metadata 144 in a data storage system 116 and applies that allocation metadata 144 when relocating data from a selected extent (e.g., 160C) to a target extent (e.g., 160F). The selected extent 160C includes a range of contiguous blocks 220. The allocation metadata 144 may identify each of these blocks 220 as either allocated or free. When relocating data from the selected extent 160C to the target extent 160F, the technique copies data of the selected extent 160C on a per-block basis, checking whether that block is allocated or free before copying it to the target extent 160F.

Having described certain embodiments, numerous alternative embodiments or variations can be made. For example, although automatic storage tiering has been described in connection with slices 160, one should appreciate that slices 160 are merely one example of storage extents upon which automatic storage tiering may operate. Alternatives include any contiguous range of storage derived from one or more disk drives, whether such disk drives are arranged using RAID technology or not.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing storage tiering in a data storage system, the method comprising:

identifying a storage extent that contains data to be relocated from a current storage tier to a flash storage tier, the storage extent providing a range of contiguous blocks and occupying a range of contiguous address space within a volume upon which a file system is built, the flash storage tier derived from a set of flash drives;

accessing allocation metadata of the file system to identify a set of allocated blocks in the storage extent that are allocated by the file system, the allocation metadata including, for each of the blocks in the storage extent, a respective value that indicates whether the respective block is allocated or free, each of the set of allocated blocks having a respective block location within the storage extent; and populating a flash extent of storage in the flash tier by copying data from each of the set of allocated blocks at the respective block locations to corresponding block locations in the flash extent, the flash extent then replacing the identified storage extent in the volume upon which the file system is built, wherein the method further comprises selecting a set of storage extents to be relocated to the flash storage tier based on combining a plurality of factors that include data temperature, allocation level, and endurance level of storage extents, the combining based on any of a weighted sum, fuzzy logic, a neural net, machine learning, or combinatorial logic.

2. The method of claim 1, wherein the identified storage extent includes a set of free blocks that are not allocated by the file system, and wherein populating the flash extent includes skipping each of the set of free blocks such that contents of the set of free blocks are not copied to the flash extent, and wherein the current storage tier is a magnetic storage tier derived from a set of magnetic disk drives.

3. The method of claim 2, further comprising:
identifying a second flash extent that contains data to be relocated from the flash storage tier to the magnetic storage tier, the second flash extent providing a range of contiguous blocks and occupying a second range of contiguous address space within the volume upon which the file system is built; and
populating a second magnetic extent of storage in the magnetic storage tier by copying all blocks in the second flash extent to the second magnetic extent, regardless of whether such blocks are allocated by the file system or not, the second magnetic extent then replacing the second flash extent in the volume upon which the file system is built.

4. The method of claim 2, further comprising:
identifying multiple storage extents whose contents are candidates to be relocated to the flash tier;
accessing a tiering policy; and
selecting a subset of the candidates whose contents are to be relocated to the flash tier based on the tiering policy.

5. The method of claim 4,
wherein the tiering policy includes a selection rule that selects extents whose contents are to be relocated to the flash tier based on a number of allocated blocks in those extents, and
wherein selecting the subset of candidates is based at least in part on the selection rule.

6. The method of claim 5, wherein the selection rule further selects extents whose contents are to be relocated to the flash tier based on endurance levels of flash drives that compose flash extents that will receive the relocated contents.

7. The method of claim 5, further comprising:
querying a plurality of flash drives that compose the flash tier to obtain metadata that describes endurance levels and/or remaining write capacity of the plurality of flash drives,
wherein selecting the subset of candidates is further based at least in part on the endurance levels and/or remaining capacity of the plurality of flash drives.

8. The method of claim 7, wherein selecting the subset of candidates is further based at least in part on matching storage extents having mostly free blocks with flash extents derived from flash drives having low endurance levels as compared with those of other flash drives in the flash tier.

9. The method of claim 8, wherein selecting the subset of candidates is further based at least in part on matching storage extents having mostly allocated blocks with flash extents derived from flash drives having high endurance levels as compared with those of other flash drives in the flash tier.

10. A data storage system, comprising control circuitry that includes a set of processing units coupled to memory, the control circuitry constructed and arranged to:
identify a storage extent that contains data to be relocated from a current storage tier to a flash storage tier, the storage extent providing a range of contiguous blocks and occupying a range of contiguous address space within a volume upon which a file system is built, the flash storage tier derived from a set of flash drives;
access allocation metadata of the file system to identify a set of allocated blocks in the storage extent that are allocated by the file system, the allocation metadata including, for each of the blocks in the storage extent, a respective value that indicates whether the respective block is allocated or free, each of the set of allocated blocks having a respective block location within the storage extent; and
populate a flash extent of storage in the flash tier by copying data from each of the set of allocated blocks at the respective block locations to corresponding block locations in the flash extent, the flash extent then replacing the identified storage extent in the volume upon which the file system is built,
wherein the control circuitry is further constructed and arranged to select a set of storage extents to be relocated to the flash storage tier based on combining a plurality of factors that include data temperature, allocation level, and endurance level of storage extents, the combining based on any of a weighted sum, fuzzy logic, a neural net, machine learning, or combinatorial logic.

11. A computer program product including a set of non-transitory, computer-readable media having instructions which, when executed by control circuitry of a data storage system, cause the control circuitry to perform a method for storing host data, the method comprising:
identifying a storage extent that contains data to be relocated from a current storage tier to a flash storage tier, the storage extent providing a range of contiguous blocks and occupying a range of contiguous address space within a volume upon which a file system is built, the flash storage tier derived from a set of flash drives;
accessing allocation metadata of the file system to identify a set of allocated blocks in the storage extent that are allocated by the file system, the allocation metadata including, for each of the blocks in the storage extent, a respective value that indicates whether the respective block is allocated or free, each of the set of allocated blocks having a respective block location within the storage extent; and
populating a flash extent of storage in the flash tier by copying data from each of the set of allocated blocks at the respective block locations to corresponding block locations in the flash extent, the flash extent then replacing the identified storage extent in the volume upon which the file system is built,
wherein the method further comprises selecting a set of storage extents to be relocated to the flash storage tier based on combining a plurality of factors that include data temperature, allocation level, and endurance level of storage extents, the combining based on any of a weighted sum, fuzzy logic, a neural net, machine learning, or combinatorial logic.

12. The computer program product of claim 11,
wherein the identified storage extent includes a set of free blocks that are not allocated by the file system, and wherein populating the flash extent includes skipping each of the set of free blocks such that contents of the set of free blocks are not copied to the flash extent, and
wherein the current storage tier is a magnetic storage tier derived from a set of magnetic disk drives, and where the method further comprises:
identifying a second flash extent that contains data to be relocated from the flash storage tier to the magnetic storage tier, the second flash extent providing a range of contiguous blocks and occupying a second range of contiguous address space within the volume upon which the file system is built; and populating a second magnetic extent of storage in the magnetic storage tier by copying all blocks in the second flash extent to the second magnetic extent, regardless of whether such blocks are allocated by the file system or not, the second magnetic extent then replacing the second flash extent in the volume upon which the file system is built.

13. The computer program product of claim 12,
wherein the identified storage extent includes a set of free blocks that are not allocated by the file system,
wherein populating the flash extent includes skipping each of the set of free blocks such that contents of the set of free blocks are not copied to the flash extent, and
wherein the method further comprises:
identifying multiple storage extents whose contents are candidates to be relocated to the flash tier;
accessing a tiering policy; and
selecting a subset of the candidates whose contents are to be relocated to the flash tier based on the tiering policy.

14. The computer program product of claim 13,
wherein the tiering policy includes a selection rule that selects extents whose contents are to be relocated to the flash tier based on a number of allocated blocks in those extents, and
wherein selecting the subset of candidates is based at least in part on the selection rule.

15. The computer program product of claim 14, wherein the selection rule further selects extents whose contents are to be relocated to the flash tier based on endurance levels of flash drives that compose flash extents that will receive the relocated contents.

16. The computer program product of claim 14, wherein the method further comprises:
querying a plurality of flash drives that compose the flash tier to obtain metadata that describes endurance levels and/or remaining write capacity of the plurality of flash drives,
wherein selecting the subset of candidates is further based at least in part on the endurance levels and/or remaining capacity of the plurality of flash drives.

17. The computer program product of claim 16, wherein selecting the subset of candidates is further based at least in part on matching storage extents having mostly free blocks with flash extents derived from flash drives having low endurance levels as compared with those of other flash drives in the flash tier.

18. The computer program product of claim 17, wherein selecting the subset of candidates is further based at least in part on matching storage extents having mostly allocated blocks with flash extents derived from flash drives having high endurance levels as compared with those of other flash drives in the flash tier.

19. The method of claim 1, wherein each value of the allocation metadata is provided for a corresponding block in the volume.

20. The method of claim 19, wherein the identified storage extent includes a set of free blocks that are not allocated by the file system, and wherein populating the flash extent includes skipping each of the set of free blocks such that contents of the set of free blocks are not copied to the flash extent.

* * * * *